United States Patent
DeSantis et al.

(10) Patent No.: US 6,516,141 B1
(45) Date of Patent: *Feb. 4, 2003

(54) APPARATUS AND METHOD FOR PROTECTING A HEATING TANK ASSEMBLY OF A HOT WATER DISPENSER

(75) Inventors: Paul M. DeSantis, Racine, WI (US); Christian Georgeff, Milwaukee, WI (US); Charles Hirsch, Brookfield, WI (US); Thomas Anderson, Arlington Heights, IL (US); Bernd Zimmermann, Ashland, OH (US)

(73) Assignee: Emerson Electric Co., St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/564,199

(22) Filed: May 4, 2000

Related U.S. Application Data

(63) Continuation-in-part of application No. 09/396,387, filed on Sep. 15, 1999, which is a continuation-in-part of application No. 09/026,070, filed on Feb. 19, 1998, now Pat. No. 6,094,524.

(51) Int. Cl.$^7$ .................................................. F24H 1/20
(52) U.S. Cl. ..................... 392/451; 392/441; 222/146.5
(58) Field of Search ................................. 392/441, 445, 392/447, 449, 451, 452, 498; 126/362.1; 222/147, 146.5

(56) References Cited

U.S. PATENT DOCUMENTS

| | | | |
|---|---|---|---|
| 3,793,934 A | 2/1974 | Martin | 99/282 |
| 3,836,050 A | 9/1974 | Dreibelbis et al. | 222/66 |
| 3,891,124 A | 6/1975 | Dreibelbis et al. | 222/66 |

(List continued on next page.)

FOREIGN PATENT DOCUMENTS

| | | | |
|---|---|---|---|
| AU | 9003794 | 6/1990 | |
| AU | 64500/90 | 4/1991 | |
| AU | 65827/90 | 5/1991 | |
| AU | 80474/94 | 6/1995 | |
| DE | 19636143 | 10/1997 | F24H/9/02 |
| EP | 0209867 | 1/1987 | |
| EP | 0790411 | 8/1997 | F15B/1/12 |
| GB | 2 065 848 A | 7/1981 | |
| JP | 61202048 | 9/1986 | |
| WO | WO 9934153 | 7/1999 | F24H/1/08 |

OTHER PUBLICATIONS

International Search Report for Corresponding Application PCT/US01/13740, dated Aug. 21, 2001.

*Primary Examiner*—Henry Bennett
*Assistant Examiner*—Thor Campbell
(74) *Attorney, Agent, or Firm*—Howley, Simon, Arnold & White, LLP

(57) ABSTRACT

A heating tank assembly for a hot water dispenser having a tank body, an electric heating element, a magnetic switch, and a movable float. The tank body has a plurality of walls and a main heating chamber for storing and heating water. At least a portion of the electric heating element is located within the main heating chamber of the tank body. The magnetic switch is electrically connected to the heating element and acts as a protective switch to the heating element. The movable float is located within the tank body and has a magnet that closes the magnetic switch when sufficient water is present in the tank. The heating tank assembly may also include at least one thermal cutout device. The thermal cutout device acts as a backup and will shut off the heating element if the heating element reaches a preset maximum temperature. The present invention also includes a method for determining whether a heating tank assembly of a hot water dispenser has little or no water by including a step of moving the float to or from the magnetic switch and closing the magnetic switch when sufficient water is present in the tank body. The present invention also includes a method for manufacturing a heating tank assembly of a hot water dispenser.

26 Claims, 7 Drawing Sheets

U.S. PATENT DOCUMENTS

| | | |
|---|---|---|
| 3,905,518 A | 9/1975 | Dreibelbis et al. .... 222/146 HE |
| 3,927,802 A | 12/1975 | Lavochkin et al. ........... 222/67 |
| 4,233,694 A * | 11/1980 | Janosko et al. ................ 4/542 |
| 4,263,498 A | 4/1981 | Meyers ...................... 392/451 |
| 4,354,094 A | 10/1982 | Massey et al. .............. 219/306 |
| 4,455,477 A | 6/1984 | Massey et al. .............. 219/328 |
| 4,513,887 A | 4/1985 | Wicke et al. ........... 222/146.5 |
| 4,687,905 A * | 8/1987 | Cunningham et al. ...... 219/336 |
| 3,642,176 A | 2/1992 | Dreibelbis et al. .... 222/146 HE |
| 5,099,825 A | 3/1992 | Massey et al. .............. 126/383 |
| 5,103,859 A | 4/1992 | Martin et al. ............... 137/448 |
| 5,426,271 A * | 6/1995 | Clark et al. .................... 200/84 |
| 5,692,096 A | 11/1997 | Massey et al. .............. 392/464 |
| 5,923,819 A | 7/1999 | Ross et al. .................. 392/441 |
| 5,955,793 A | 9/1999 | Khadkikar et al. ......... 307/117 |
| 6,266,485 B1 * | 7/2001 | DeSantis et al. ........... 392/452 |

* cited by examiner

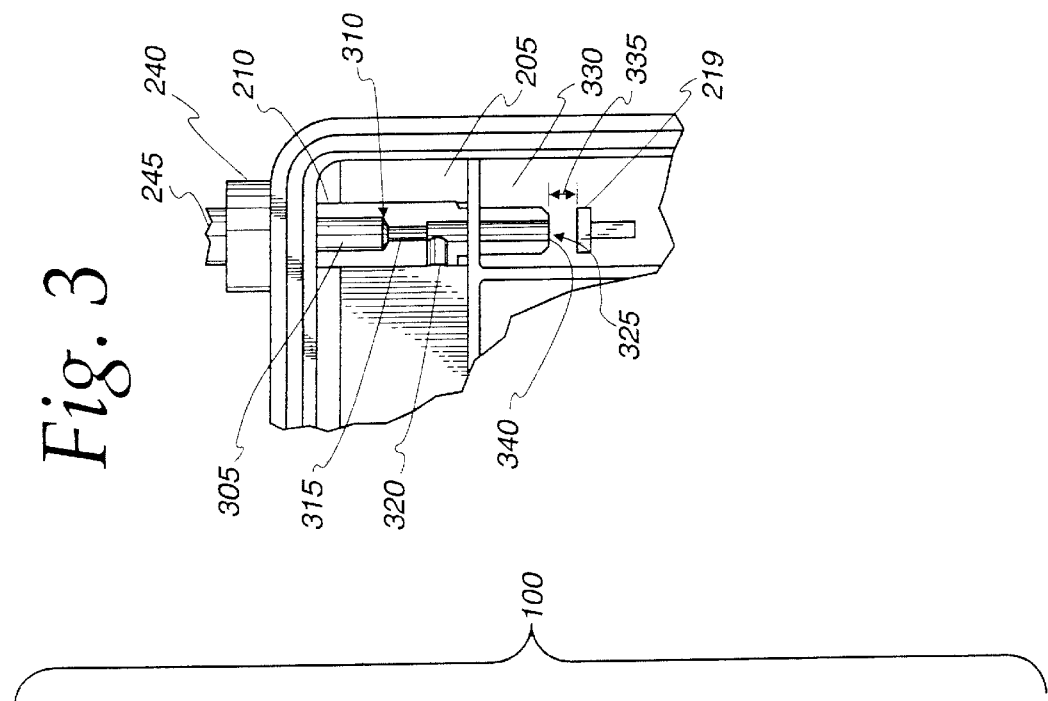
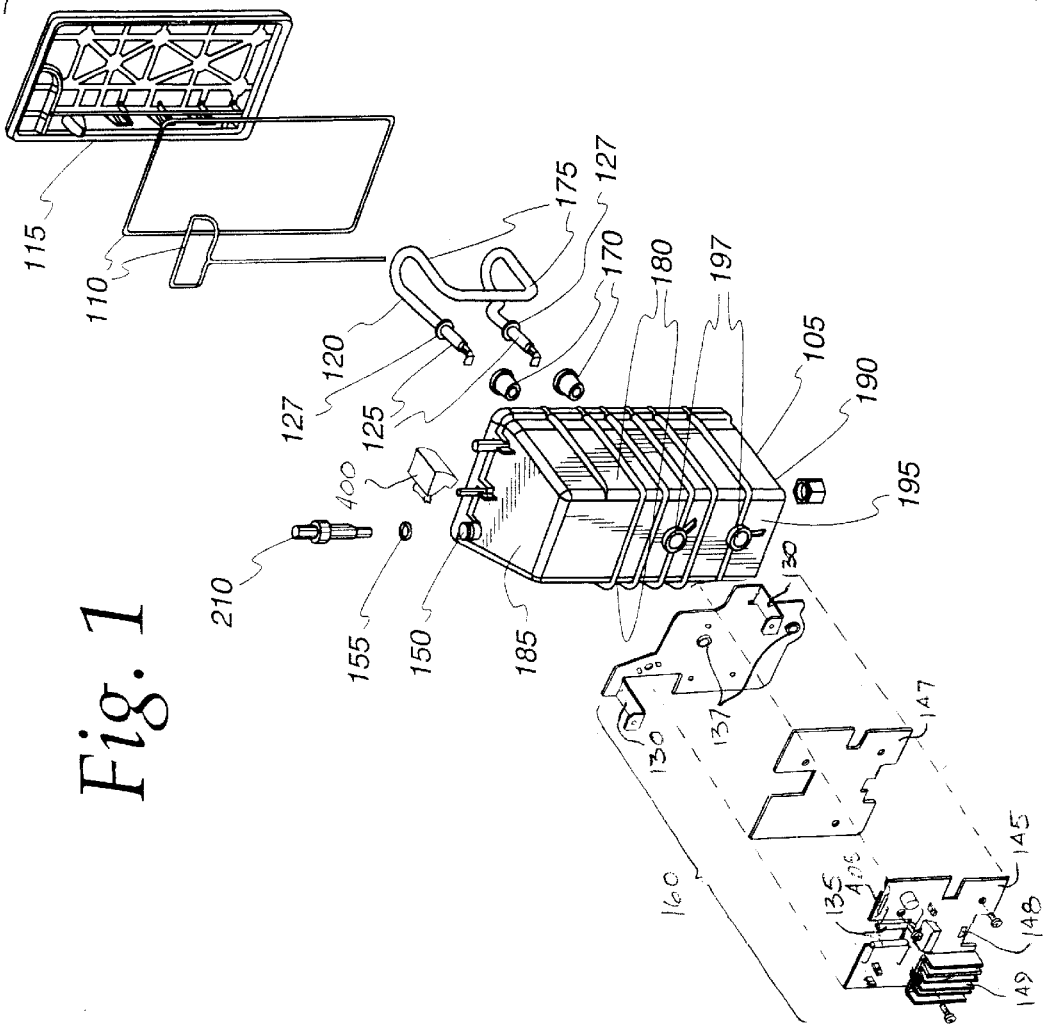

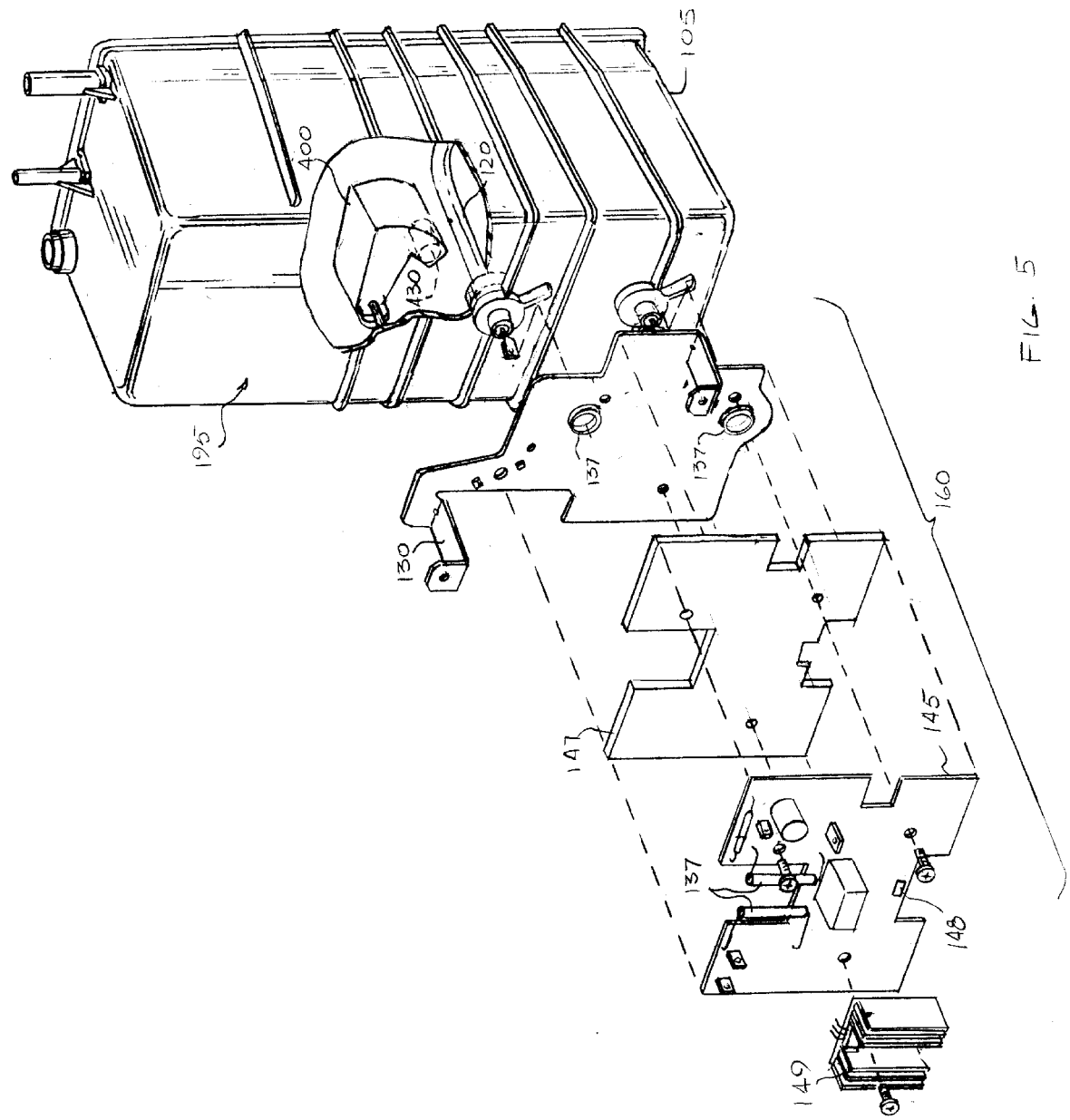

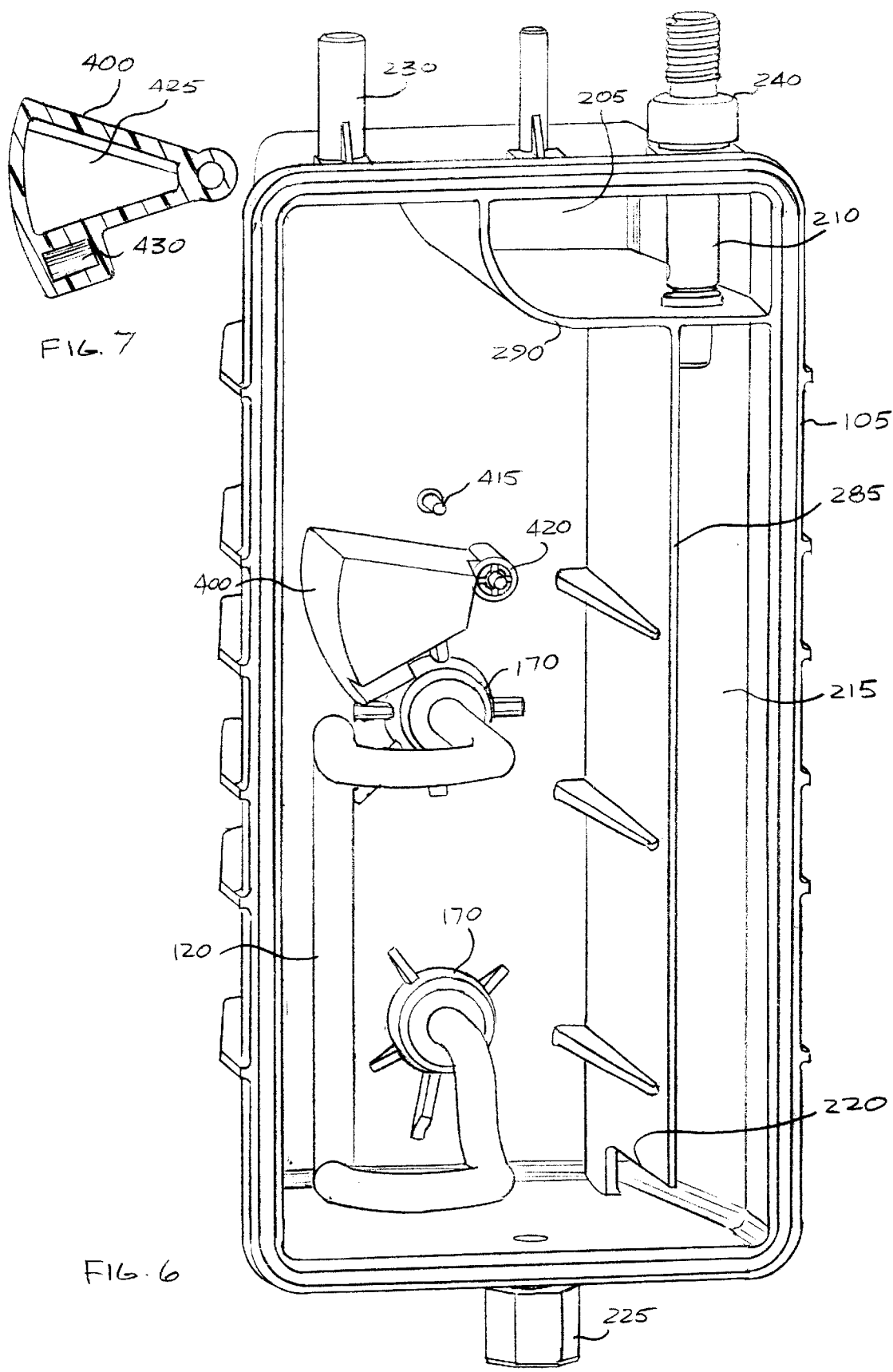

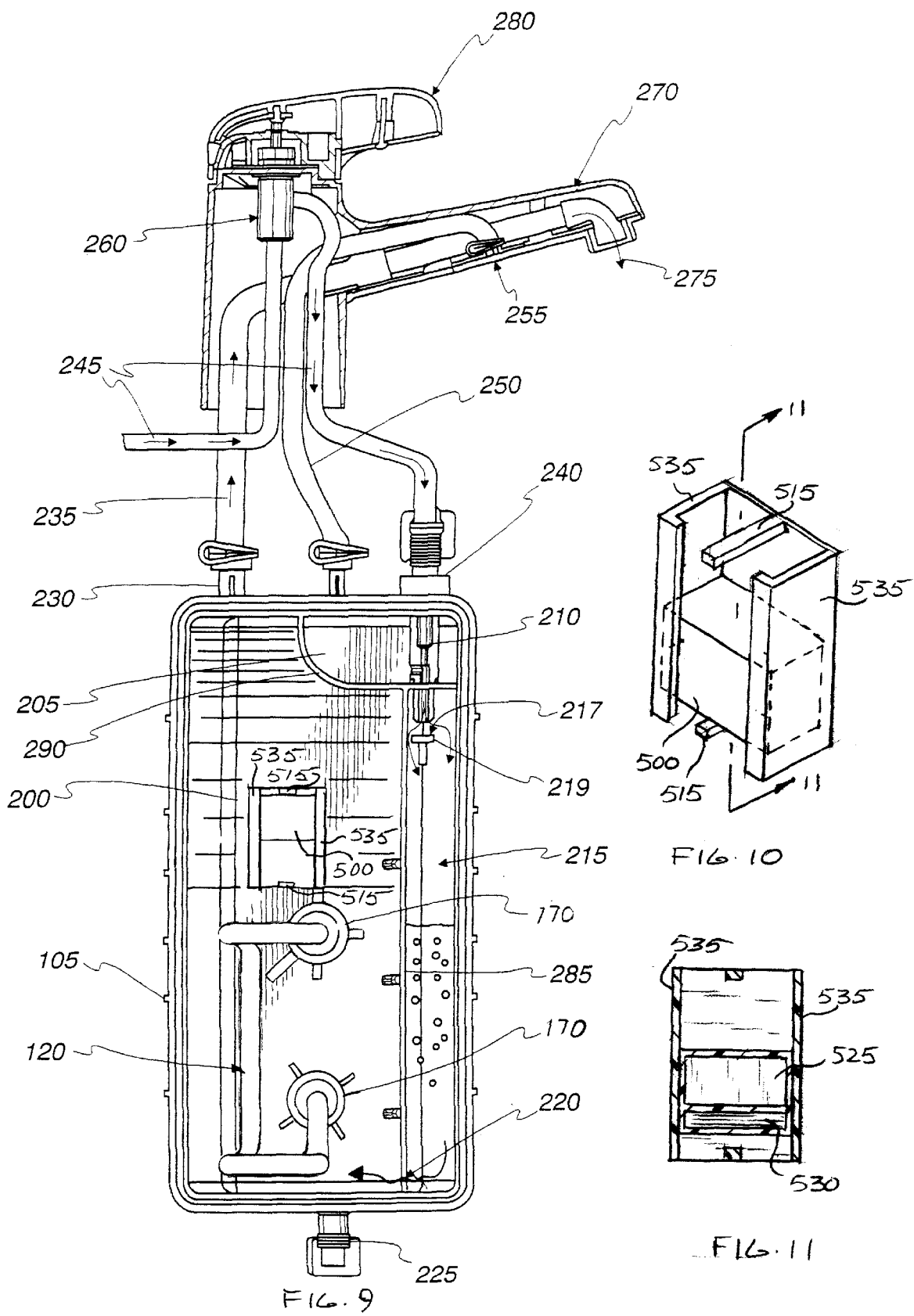

APPARATUS AND METHOD FOR PROTECTING A HEATING TANK ASSEMBLY OF A HOT WATER DISPENSER

CROSS REFERENCE TO RELATED APPLICATION

This application is a continuation-in-part of U.S. patent application Ser. No. 09/396,387, filed Sep. 15, 1999, which is a continuation-in-part of U.S. patent application Ser. No. 09/026,070, filed Feb. 19, 1998, now U.S. Pat. No. 6,094,524.

FIELD OF INVENTION

The present invention relates generally to hot water dispensing systems having a plastic heating tank. In particular, the present invention relates to a water heating tank with a float switch sensor and thermal cutout devices for protecting the tank when the tank has little or no water.

BACKGROUND OF THE INVENTION

Hot water dispensers are known in the marketplace. As used herein, "hot water" refers to water at temperatures at or about 190° Fahrenheit (88° Celsius), but at or below the boiling point of water (212° Fahrenheit/100° Celsius). Water at this high temperature can be made available at a dedicated faucet for users needing hot water to make, for example, coffee, tea, or cocoa. A typical dispenser heats water in a relatively small tank that is situated below the sink on which the dedicated faucet is mounted. The tank may have a capacity of ⅓ or ½ gallon (1.3 or 1.9 liters). The tanks are usually divided into multiple chambers, such as a main chamber and an expansion chamber. Water is heated electrically by a heating element in the main chamber. The expansion chamber is contiguous with the main chamber and contains water that is initially heated in the main chamber and allowed to expand into the expansion chamber to preclude pressure buildup generated by heating the water.

Most known water heating chambers and tanks utilize metal fabricating wherein several pieces of metal must be integrated together to create separate air and watertight chambers. The fabrication of metal tanks is labor intensive and requires expensive cleaning operations. Metal tanks are also susceptible to leaks because the tank is made from several pieces of metal.

As a result, a hot water dispenser with a plastic tank was developed and is the subject of application Ser. Nos. 09/396,387 and 09/026,070, which are owned by the assignee and incorporated herein by reference in their entirety. As explained in those applications, the plastic tank is cheaper and easier to fabricate. The plastic tank, however, is vulnerable to damage when the heating element is activated when little or no water is present in the tank. For instance, damage is likely to occur during an accidental "dry start," which happens after installation of the tank and before water has been introduced into the system. Hot water dispensers are typically not sold with an on/off switch, so once the unit is plugged in, the heater will be energized. Damage may also occur during a rare "boil dry" condition, when the water in the tank boils until the water level becomes too low. Damage to a tank may occur very quickly, within the first minute or two after the heating element is energized. By the time a person or system recognizes the problem, it is typically too late to avoid damage.

Accordingly, a need exists to prevent damage to a tank when little or no water is present in the tank. Application Ser. No. 09/479,190, which is owned by the assignee and incorporated herein by reference in its entirety, discloses a tank for a hot water dispenser that includes at least one heat dissipation plate. Heat is diverted from the walls of the tank to the heat dissipation plate. The present invention, however, prevents damage to the tank by inhibiting the activation of the heating element when little or no water exists in the tank. By inhibiting the heating element from energizing, the potential for excessive heat generation is eliminated.

SUMMARY OF THE INVENTION

To that end, the present invention provides a heating tank assembly for a hot water dispenser having a tank body, an electric heating element, a magnetic switch, and a movable float. The tank body has a plurality of walls and a main heating chamber for storing and heating water. At least a portion of the electric heating element is located within the main heating chamber of the tank body. The magnetic switch is electrically connected to the heating element and acts as a protective switch to the heating element. The movable float is located within the tank body and has a magnet that closes the magnetic switch when sufficient water is present in the tank.

The tank body and movable float are preferably made of molded plastic. The float may, alternatively, be made of plastic with a foaming agent. The magnetic switch is preferably a Reed switch. In one embodiment, the magnetic switch is normally open. As sufficient water is added to the heating tank assembly, the float moves within proximity to the magnetic switch and closes the switch, enabling the heating element to be energized. The magnetic switch, however, may also be normally closed. In this embodiment, the float is already in close proximity to the switch when little or no water is present in the tank. As sufficient water is added to the heating tank assembly, the float moves away from the magnetic switch and closes the switch, enabling the heating element to be energized.

The heating tank assembly may also include at least one thermal cutout device. The thermal cutout device is located in close proximity to a portion of the heating element that is outside the tank body. The thermal cutout device acts as a thermal fuse and can shut off the heating element when the heating element reflects a preset temperature.

In another embodiment, the present invention provides a hot water dispenser having a plastic molded tank body, an electric heating element, and a switch. The plastic molded tank body has a plurality of walls and a main heating chamber for storing and heating water. The heating element extends at least partially into the heating chamber through a bushing mounted to a hole in the tank body. The switch is electrically connected to the heating element and is capable of determining whether little or no water is present in the tank body. The switch inhibits the activation of the heating element if the tank body has little or no water.

In a further embodiment, the present invention is a method for determining whether a heating tank assembly of a hot water dispenser has little or no water. The method includes providing a unitary plastic molded tank body, an electric heating element, a magnetic switch, and a movable float. The tank body has a heating chamber, and at least a part of the heating element is located within the heating chamber. The magnetic switch is electrically connected to the heating element. The movable float is located within the tank body and has a magnet. The method includes the steps of moving the float within proximity to the magnetic switch and closing the magnetic switch when sufficient water is present in the tank body. In another embodiment, the method includes the alternative steps of moving the float away from the magnetic switch and closing the magnetic switch when sufficient water is present in the tank body.

In yet another embodiment, the present invention is a method for manufacturing a heating tank assembly of a hot water dispenser. The method includes the steps of providing a unitary molded plastic tank body having a heating chamber, providing an electric heating element, mounting the electric heating element to the tank body, providing a magnetic switch, mounting the magnetic switch to the tank body, electrically connecting the magnetic switch to the heating element, providing a float that has a magnet, and positioning the float in the tank body such that the magnet of the float closes the magnetic switch when sufficient water is present in the tank body.

In another embodiment, a heating tank assembly is provided and includes a tank body, an electric heating element, and at least one thermal cutout device. The tank body has a plurality of walls and a main heating chamber for storing and heating water. The heating element is mounted to the tank body and has a first portion located outside the tank body and a second portion located inside the tank body. The thermal cutout device is located in close proximity to the first portion of the heating element and is capable of shutting off the heating element when the heating element reaches a preset temperature. The thermal cutout device may also be wrapped in insulating tape to prevent shorting to the heating element.

BRIEF DESCRIPTION OF THE DRAWINGS

Other objects and advantages of the invention will become apparent upon reading the following detailed description and upon reference to the drawings.

FIG. 1 is an exploded view of a heating tank assembly of a hot water dispensing system.

FIG. 3 is an enlarged view of a venturi valve aspirator of the hot water dispensing system.

FIG. 5 is an exploded view of a temperature control system of a heating tank assembly.

FIG. 6 is a perspective view of the inside of the heating tank assembly for one embodiment of the present invention.

FIG. 7 is a cross-sectional view of a float for one embodiment of the present invention.

FIG. 9 is a cross-sectional view of another embodiment of the present invention showing a heating tank assembly mounted to a dispensing faucet.

FIG. 10 is a perspective view of a float for another embodiment of the present invention.

FIG. 11 is a cross-sectional view of the float in FIG. 10.

Figure 2:
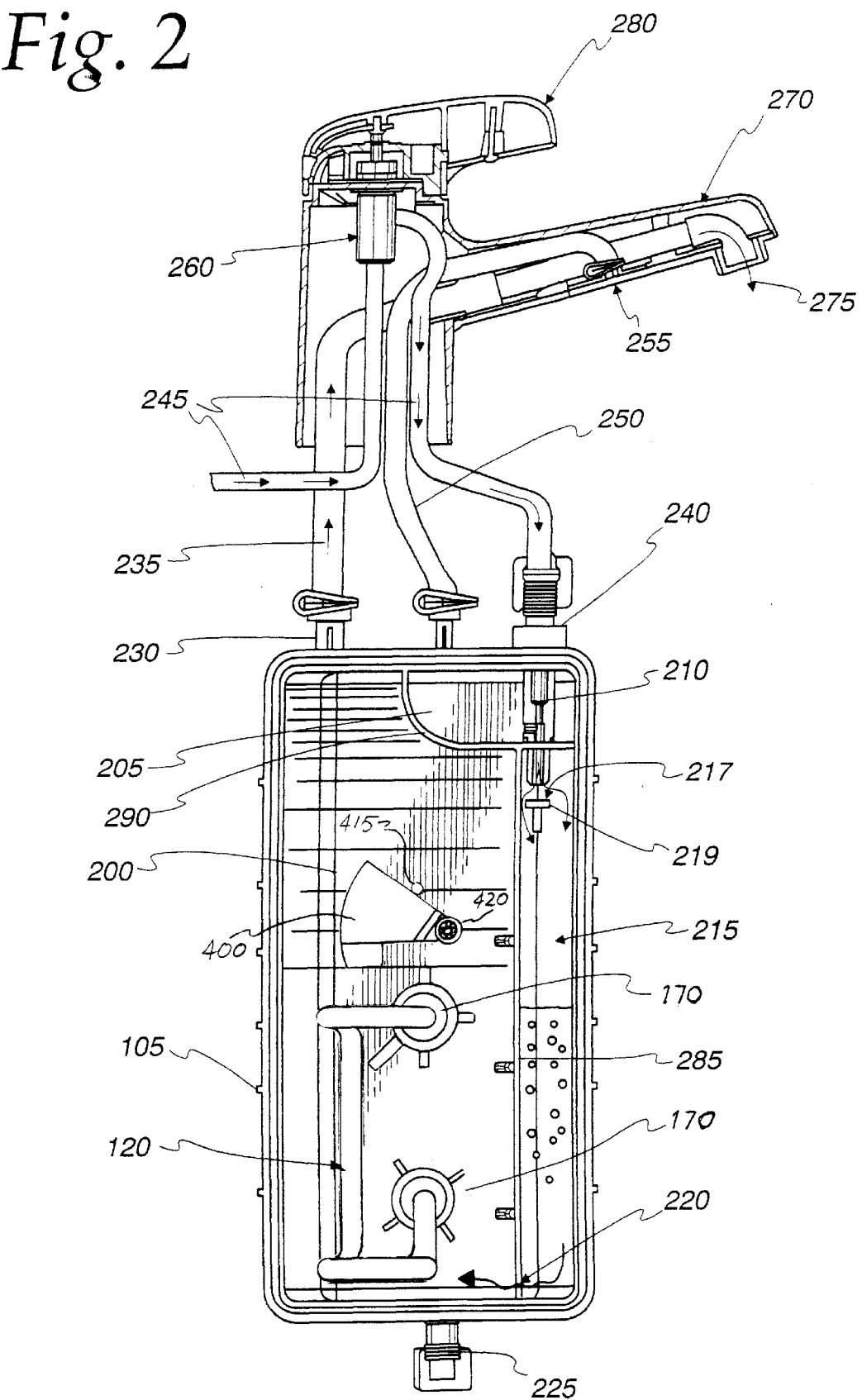
FIG. 2 is a cross-sectional view of one embodiment of the present invention showing a heating tank assembly mounted to a dispensing faucet.

While the invention is susceptible to various modifications and alternative forms, a specific embodiment thereof has been shown by way of example in the drawing and will herein be described in detail. It should be understood, however, that it is not intended to limit the invention to the particular forms disclosed but, on the contrary, to cover all modifications, equivalents, and alternatives falling within the spirit and scope of the invention as defined by the appended claims.

DESCRIPTION OF ILLUSTRATIVE EMBODIMENTS

FIG. 1 depicts an exploded view of a heating tank assembly 100. The heating tank assembly includes, among other things, a tank body 105, Emaweld® strands 110 and 155, a tank cover 115, a heating element 120, a temperature control system 160, a venturi valve 210, a float 400, a magnetic switch 405, and thermal cutout devices (TCO) 135.

The tank body 105 is formed from a plastic material and is comprised of two side walls 180, a top wall 185, a bottom wall 190, and a rear wall 195 containing two holes or orifices 197. The design of one embodiment of the present invention is described as a one piece plastic tank construction. Each tank chamber, the venturi valve and all inlet/outlet ports are all injection-molded using conventional techniques and preferably composed of plastic. The one piece plastic molded configuration of one embodiment of the present invention greatly reduces the cost and labor required to make the tank, as well as significantly reducing the potential for leaks. The plastic tank is considered to be one piece after a tank cover 115 and a venturi valve 210 are integrally heat-bonded to the five sided tank body 105 using an Emabond® electromagnetic welding system. The Emabond® welding system is commercially available from the Ashland Chemical Company of Columbus, Ohio.

The Emabond® welding system utilizes ferromagnetic material called Emaweld® that is placed between the tank body 105 and the tank cover 115. The Emaweld® sections are spaghetti-type bonding strands that are subjected to alternating magnetic fields that cause the strands to melt and fuse the tank body 105 to the tank cover 115, creating structural, hermetic, pressure-tight, and leak-proof seals. The heat-bonded tank cover 115 eliminates the need for a sealing system with additional materials and components, ie., fasteners, sealing materials, etc. The elimination of metal components from the construction of the plastic tank further reduces heat loss from the water through the high heat conductivity of metal. Before the tank cover 115 is heat-bonded to the tank body 105, silicone cylindrical bushings 170, the heating element 120, and the float 400 are inserted. As shown in FIG. 1, the silicone cylindrical bushings 170 are inserted into two holes or orifices 197 in the rear wall 195 of the tank body 105, and the heating element 120 is placed inside the main heating chamber 200 of the tank body 105. A metal washer 127 is welded to each arm 125 of the heating element 120. The two arms 125 of the heating element 120 are inserted into and extended through the silicone cylindrical bushings 170 until the metal washers 127 prevent further passage of each arm 125 of the heating element 120 through the silicone cylindrical bushings 170. In one embodiment, as shown in FIG. 2, the float 400 is retained on a pivot post 410 by a retaining ring 420.

Because the tank body 105 is made of plastic construction, a unique system for sensing the water temperature and the water level inside the water heating chamber is also provided. The water temperature is sensed using a metal temperature sensing bracket 130 located on the outside of the tank body 105. The metal temperature sensing bracket 130 is crimped to the two arms 125 of the heating element 120 as described below. It has been contemplated, in accordance with the present invention, that the temperature bracket 130 may be composed of copper or a composite of various metals. Two orifices 137 in the temperature bracket 130 correspond to and are aligned with the respective two orifices 197 in the rear wall 195 of the tank body 105. The two arms 125 of the heating element 120 extend through the silicone cylindrical bushings 170, through the two orifices 197 in the rear wall 195 of the tank body 105, and emerge on the outside of the tank body 105. The two arms 125 subsequently reach through the two corresponding orifices 137 of the temperature bracket 130.

A sheath 175 is the outer covering of the entire heating element 120 and is composed of heat conducting metal. The sheath is composed of metal to assist the temperature control system 160 in responding quickly to changes in the water temperature with the tank body 105. A crimping machine (not shown) crimps the outside of the two orifices 137 of the temperature bracket 130 onto the sheath portion 175 at the end of the two arms 125 of the heating element 120 to secure the temperature bracket 130 and the tank body 105 to the heating element 120. Crimping the orifices 137 of the temperature bracket 130 to the heating element 120 ensures a good metal connection between the temperature bracket 130 and the sheath 175. Because the temperature bracket 130 and the sheath 175 are excellent heat conductors, the temperature bracket 130 is able to detect changes in the water temperature through the heating element 120. A good connection between the temperature bracket 130 and the sheath 175 is needed to ensure that a thermostat 145 can accurately calculate and control the temperature of the water on the inside of the tank. It is beneficial for the thermostat 145 to maintain a temperature setting within +/−1 degree. The thermostat 145 is attached to the temperature bracket 130. A thermostat insulator pad 147 is used to insulate the thermostat 145 from the temperature bracket 130. The insulator pad 147 had a cutout for a sensor 148. The sensor 148 is mounted to the back of the board of the thermostat 145 and senses the temperature of the temperature bracket 130 that correlates with the water temperature inside the tank body 105. A suitable sensor 148 is described in U.S. Pat. No. 5,955,793, which is incorporated herein by reference in its entirety. The sensor 148 and thermostat 145 maintain the water temperature inside the tank body 105 at around 190° Fahrenheit (88° Celsius), but always at or below the boiling temperature (212° Fahrenheit/100° Celsius) of water. A heat sink 149 is also provided to dissipate excess heat generated in the temperature bracket 130.

Figure 4A:
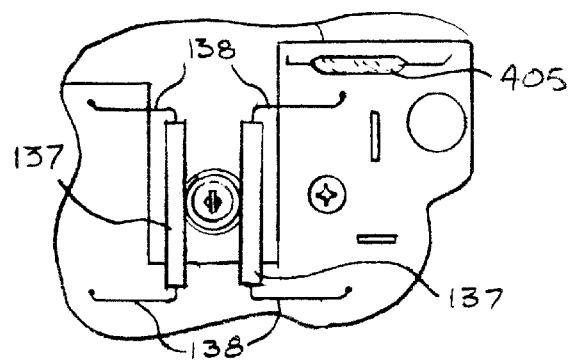
FIG. 4 is an assembly view of the temperature control system of the hot water dispensing system.
Figure 4:
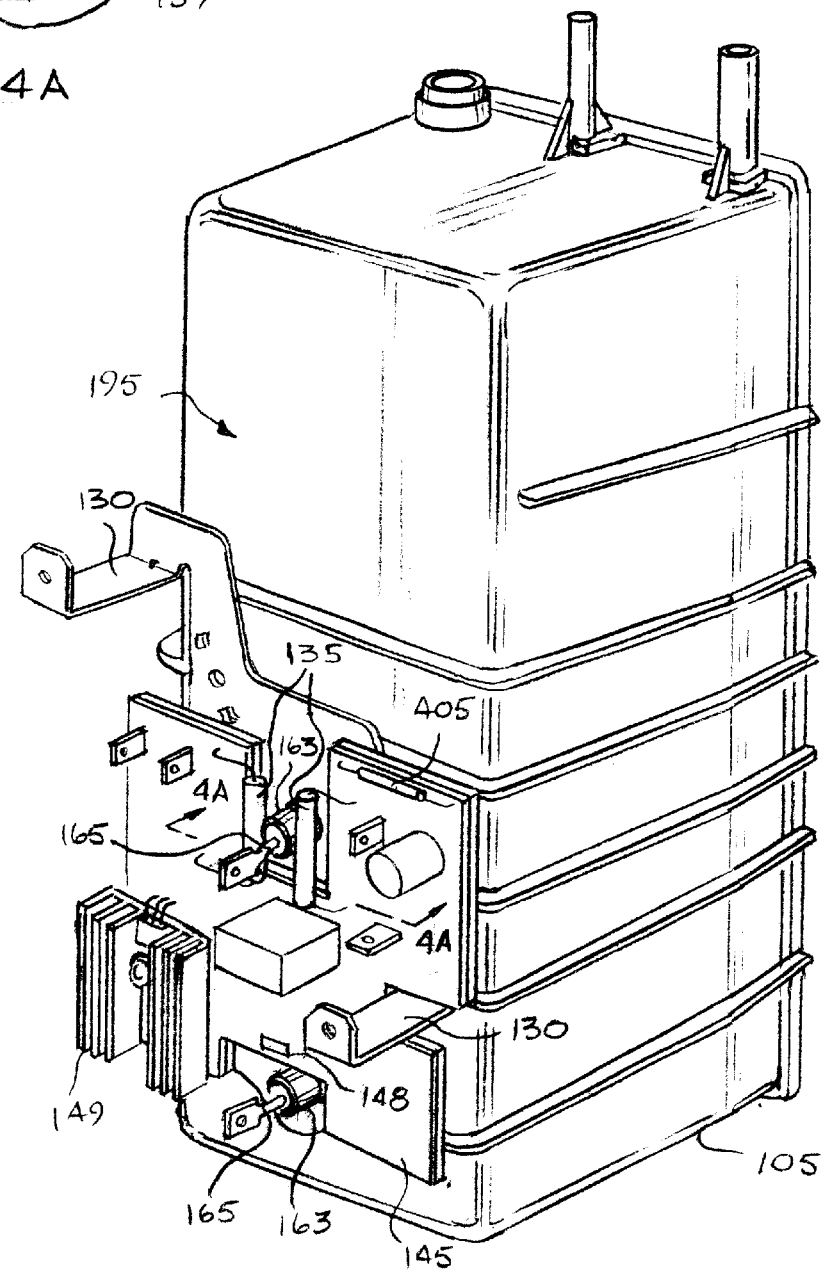

As shown in FIG. 4, a small tube 163 extends from each orifice 137 of the temperature bracket 130. A cold pin 165 extends from a position exterior to the tube 163, through the tube 163, and into the inside of the heating element 120. It is preferable that the cold pin 165 extends from about 0.5 inches to about 1.5 inches past the tube 163, and into the heating element 120 and, more preferably, that the cold pin extends about 1 inch past the tube 163 and into the heating element 120. A heater wire (not shown) within the heating element 120 on the interior of the tank body 105 is connected to the end of the cold pin 165 that extends into the heating element 120, as described above. It is contemplated, in accordance with the present invention, that the heater wire can be welded or crimped to the end of the cold pin 165.

When the temperature drops below a certain preset level, the thermostat 145 (via a wire connecting the thermostat 145 and the cold pin 165) directs a flow of current through the cold pin 165 and into the heater wire within the heating element 120. The current flows through the wire within the heating element 120 and exits at the cold pin at the other arm 125 of the heating element 120. Due to the resistive characteristics of the wire, the current passing through the wire produces heat, which, in turn, causes the temperature of the heating element 120 to increase. This subsequently causes the temperature of the water inside the tank body 105 to increase.

A packing material is placed within the tube 163 to secure the heater wire and the cold pin 165 within the tube 163 and to insulate the heater wire from touching the walls of the heating element 120. The packing material is packed using a vibration method to tightly compress the packing material. It is contemplated, in accordance with the present invention, that an example of the packing material used within the tube is magnesium oxide in powder form. A sealing compound is placed outside the packing material to seal the packing material and retard the absorption of moisture. One example of the sealing material used in accordance with the present invention is silicone liquid.

FIGS. 4 and 5 are assembled and exploded views of the temperature control system 160. The metal temperature sensing bracket 130 is located on the outside of the tank body 105. The thermostat 145 is connected to the temperature bracket 130.

A wire harness (not shown) allows the temperature control system 160 to obtain electrical power.

In determining whether sufficient water is present in the heating tank assembly 100 before energizing the heating element 120, the heating tank assembly 100 has a float 400 and a magnetic switch 405. Determining whether the heating tank assembly 100 has little or no water is important before activating the heating element 120. Since the tank body 105 and components are made from plastic, the wattage of the heater element 120 needs to be controlled to prevent the tank body 105 and components from melting or otherwise deforming. For instance, a tank body 105 may be damaged during an accidental "dry start," which happens when the heating element is activated after installation of the tank and before water has been introduced into the system.

Accordingly, referring to FIGS. 2, 5 and 6, a movable float 400 is used to determine if sufficient water is present in the heating tank assembly 100. In one embodiment of the present invention, the float 400 is triangular in shape and rotates on a pivot post 410. The float 400 is retained on the pivot post 410 by a retaining ring 420. As water enters the heating tank assembly 100, the float 400 rises until it reaches a stop post 415. The pivot post 410 and the stop post 415 may be formed as part of the injection molding process of the tank body 105. Forming the posts 410 and 415 as part of the tank body 105 eliminates the need for additional holes or openings, reducing the chances of leaks.

Referring to FIG. 7, in one embodiment, the float 400 contains an air pocket 425 and a magnet 430. The float 400 may be made of plastic or other non-metallic material. The float 400 is sealed so that air is retained in the pocket 425 when the heating tank assembly 100 is filled with water. In alternative embodiments, the air pocket 405 may be replaced with Styrofoam or other floatable materials. The float may also be made of plastic with a foaming agent to further assist the float to rise when water is added to the tank body 105.

As shown in FIG. 4, a magnetic switch 405 is mounted to the temperature control system 160. The magnetic switch 405 is electrically coupled to the heater element 120 and acts as a protective switch for the heater element 120. The magnetic switch 405 may be a Reed switch which is commercially available from Hasco Components International Corp. of Bellerose Village, New York. A Reed switch is a proximity sensor that detects the presence of a magnet.

The Reed switch has two ferromagnetic contacts that can either be normally open or normally closed.

Figure 8:
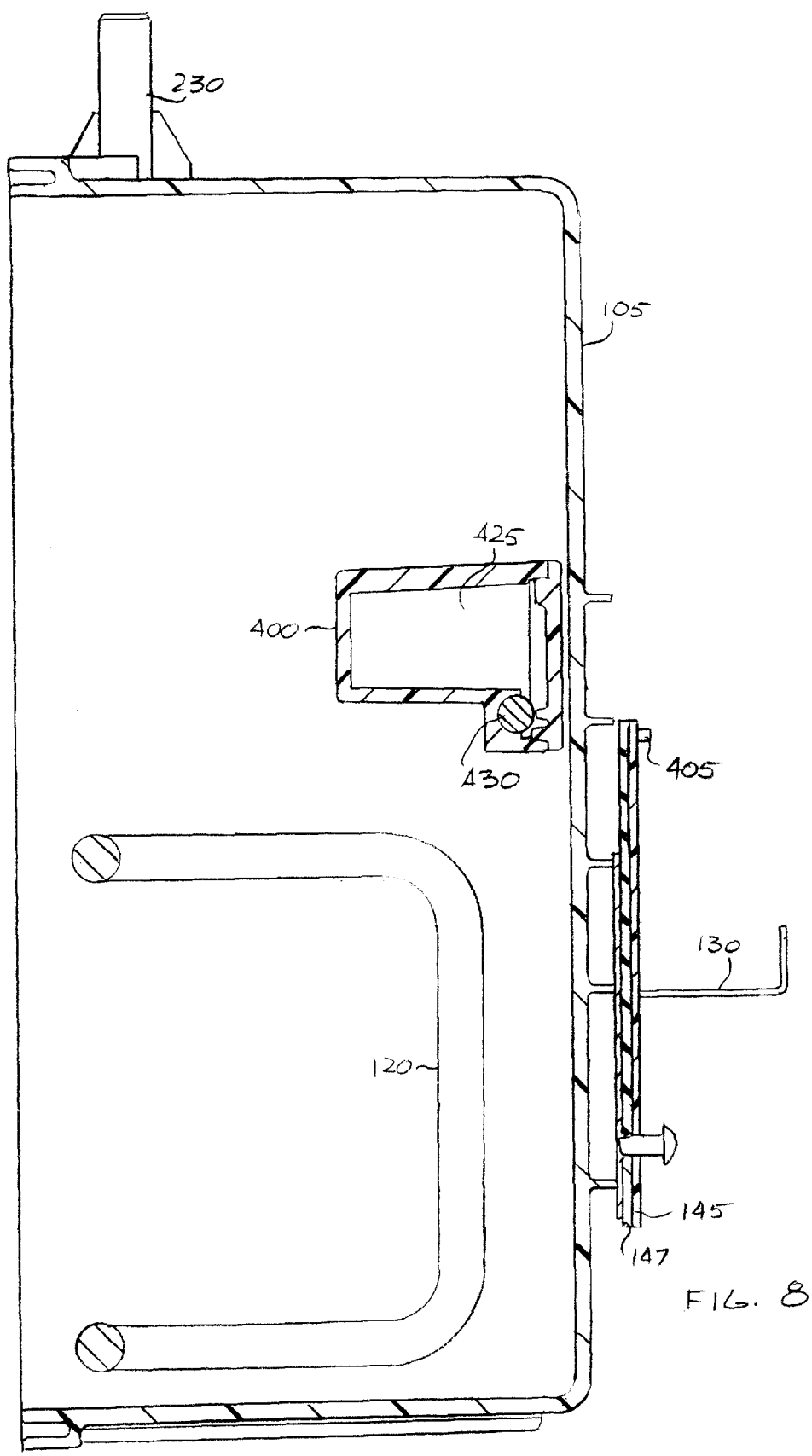
FIG. 8 is a cross-sectional side view of a heating tank assembly for one embodiment of the present invention.

In one embodiment of the present invention, the magnetic switch 405 is normally open. When little or no water is present in the heating tank assembly 100, the magnet 430 is not located in close proximity to the magnetic switch 405 and the switch remains open (as shown in FIG. 6). When the magnetic switch 405 is open, no power can be applied to the heating element 120. As water fills the heating tank assembly 100, the float 400 (and magnet 430) rises to the stop post 415 and a magnetic field is introduced to the magnetic switch 405 by bringing the magnet 430 into proximity with the magnetic switch 405, as shown in FIGS. 2 and 8. The presence of a magnetic field attracts the two contacts in the normally open magnetic switch 405, causing the switch to close. When the magnetic switch 405 is closed, power may be applied to the heating element. The magnetic switch 405 is operational with a variety of DC voltages.

In another embodiment, the magnetic switch 405 is normally closed. In this embodiment, however, the magnet 430 is already in close proximity to the magnetic switch 405 when little or no water is present in the heating tank assembly 100. Thus, the presence of a magnetic field repels the two ferromagnetic contacts of the magnetic switch 405 and the switch opens. When the magnetic switch 405 is open, no power may be applied to the heating element 120. As water fills the heating tank assembly 100, the float 400 (and magnet 430) rises and the magnetic switch 405 closes. When the magnetic switch 405 is closed, power may be applied to the heating element 120.

The float 400 may be of other shapes. For instance, referring to FIGS. 9, 10 and 11, in a further embodiment of the present invention, a float 500 is rectangular or cubed and allowed to traverse up and down along tracks 535. The float 500 is constrained in the upward and downward positions by stop posts 515. The float may also be spherical or elliptical and allowed to traverse up and down tubular walls.

The benefit of using a float and magnetic switch is that no additional holes or openings are needed in the tank body 105, reducing the chances of leaking.

Thermal cutout devices (TCO) 135 provide excellent temperature sensing capabilities and may be used as a backup to float 400. The TCO's are a limiting thermostat that protect the tank from abnormal conditions, such as no or low water conditions in the tank, by shutting off the heating element when the temperature reaches a preset maximum allowable temperature for the tank and/or system. In one embodiment, the TCO's 135 are mounted via leads 138 to the thermostat 145. As shown in FIG. 4A, the leads 138 are bent inward so that the TCO's 135 are next to the exterior surface of tube 163. As described above, the tube 163 is a portion of the heating element 120 that expands outside the tank body 105. In this embodiment, the TCO's 135 are wrapped in insulating tape to prevent shorting to the heating element 120. Examples of suitable insulating tape include Kaptom/Nomex spiral tape and teflon tape. In another embodiment, the TCO's 135 are mounted to the temperature bracket 130 and sense the temperature of the water in the same manner as the thermostat 145, as described above. The TCO's 135, conventional and low cost temperature sensing devices, are non-invasive in that they eliminate the need to put yet another hole in the tank and provides a separate temperature sensor. Thus, a simpler design is created, further reducing the cost of the heating system. The TCO's 135 are commercially available from Therm-O-Disc, Inc., of Mansfield, Ohio.

FIG. 2 depicts a cross-section of an assembled hot water dispensing system mounted to a dispensing faucet. The illustrated hot water dispensing system comprises a tank body 105 divided into a main heating chamber 200 and an expansion chamber 205 in fluid communication with and communicatively coupled to the main heating chamber 200. The tank body 105 includes an internal wall 285 separating the main heating chamber 200 from the air collection chamber 215 and another internal wall 290 separating the expansion chamber 205 from both the main heating chamber 200 and the air collection chamber 215. The bottom of the internal wall 285 includes an opening 220 to provide fluid communication between the main heating chamber 200 and the air collection chamber 215.

An undesirable feature of previously manufactured hot water dispensing systems arises when the water level in the expansion chamber drops to a level low enough for air to be drawn in through aspirator lateral hole(s) from the vented expansion chamber. In one embodiment of the present invention, the air collection chamber 215 is positioned within the tank body 105, residing generally below the expansion chamber 205 and adjacent to the main heating chamber 200. The incoming water supply line 245 provides water at line pressure to the plastic venturi valve 210 located within the expansion chamber 205 whenever a user actuates the operating handle 280 of the hot water faucet 270. Arrows in FIG. 2 indicate the flow direction of the water.

The venturi valve 210 directs entering water into the top 217 of the air collection chamber 215. The venturi valve is positioned within the expansion chamber 205 and is embedded to the tank through use of the previously described Emabond® welding system. Specifically, in one embodiment of the present invention, the tank body 105, as shown in FIG. 1, comprises an orifice 150 with a vertical rim extending away from the orifice 150. The venturi valve 210 is placed through the orifice 150 and situated within the expansion chamber 205, as shown in FIG. 2. After the venturi valve 210 is inserted, a flange of the venturi valve 210 is disposed around the vertical rim of the orifice 150, creating a pocket between the flange of the venturi valve 210 and the vertical rim of the orifice 150. Referring back to FIG. 1, an Emaweld® section 155 is installed within this pocket to embed the venturi valve 210 integral to the tank.

Referring to FIG. 2, in order to obtain hot water for consumption, a user actuates the operating handle 280 of the faucet 270. A supply line infeed valve 260 of the faucet is opened and closed by actuating an operating handle 280 of the faucet 270. It is contemplated, in accordance with the present invention, that user-initiated raising, pushing, or turning can actuate the operating handle 280. Actuating the operating handle 280 causes water to be fed into the incoming water supply line 245, through the tank inlet 240, and into the venturi valve 210 located within the expansion chamber 205. Water in the main heating chamber 200 is heated by the heating element 120 and allowed to expand into the expansion chamber 205 through the venturi valve 210 and, subsequently, the lateral hole 320 during times when water is being heated and expanded. It is contemplated, in accordance with the present invention, that more than one lateral hole may exist on the venturi valve 210. Water from the main heating chamber 200 does not expand into the expansion chamber 205 when water from the incoming water supply line 245 is traversing the venturi valve 210.

After water enters the venturi valve 210 from the incoming water supply line 245, negative pressure develops in the venturi valve 210 relative to the pressure in the expansion chamber 205. The negative pressure in the venturi valve 210 causes aspiration of hot water from the expansion chamber 205 into the air collection chamber 215. A jet stream mixture of hot water from the expansion chamber 205 and cold water from the incoming water supply line 245 is then projected from the venturi valve 210 into the top of the air collection chamber 215. When the expansion chamber 205 is emptied of water, air begins to be aspirated from the expansion chamber 205. Because air is lighter than water, air is captured in the air collection chamber 215. Any air collected in the air collection chamber 215 is subject, at its lower opened end, to hydrostatic pressure from the water. The air collection chamber 215 can be filled sufficiently deep with air at a pressure that will balance against the water pressure in the tank.

As the collected air in the air collection chamber 215 pushes against the weight of the water in the tank, a positive pressure develops in the air collection chamber 215 and counters a vacuum pressure that develops in the venturi valve 210. The aspiration of air from the expansion chamber 205 slowly decreases with the increasing air pressure in the air collection chamber 215. The aspiration of air ceases when the air pressure in the air collection chamber 215 equals the vacuum pressure in the venturi valve 210. Water from the incoming water supply line 245 will still be fed into the venturi valve 210 as long as the faucet valve remains open.

After the water from the incoming water supply line 245 and the expansion chamber 205 is forced into the air collection chamber 215 through the venturi valve, the water arrives at the main heating chamber 200 via an opening 220 at the lower end of the air collection chamber 215. Hot water is then forced out of the main heating chamber 200, through the hot water line 235, and into the faucet 270 for consumer usage. The minimum square surface area of the water within the air collection chamber 215 is important. The square surface area of the water in the air collection chamber 215 is indirectly related to the amount of pressure required in the air collection chamber 215 and into the main heating chamber 200. The smaller the square surface area of the water, the greater the pressure that is required to force water out of the expansion chamber 205.

The air collection chamber 215 is located below the level of the expansion chamber 205 and is communicatively coupled to the main heating chamber 200. In one embodiment of the present invention, the air collection chamber 215 is rectangular and narrow relative to the main heating chamber 200. It is contemplated, in accordance with the present invention, that the air collection chamber 215 can be cylindrical or any other shape that would permit the passage of water as described in the present invention. It is also contemplated that the air collection chamber 215 could be about the same size or larger than the main heating chamber 200.

It is foreseeable, but undesirable, for the venturi jet velocity pressure to be extreme enough to drive collected air out of the bottom of the air collection chamber 215 and into the main heating chamber 200. This action is precluded in cases where such action could occur by installing a plastic deflector baffle 219 proximate to the exit end 340 of the venturi valve 210. The plastic deflector baffle 219 is arranged such that the venturi jet of water from the exit end 340 of the venturi valve 210 is impinges upon the plastic deflector baffle 219 to dissipate the kinetic energy of the water and prevent air from exiting the air collection chamber 215 through the opening 220 at the bottom of the internal wall 285. After impinging upon the plastic deflector baffle 219, the air and water separate. Without the baffle, air exiting the air collection chamber 215 and entering the main heating chamber 200 would rise to the top of the main heating chamber, and bubbles of air would dispense with the outflowing hot water and produce undesired spitting and surging of air bubbles intermixed with the hot water exiting the main heating chamber 200 for consumer use. Instead of exiting the tank from the main heating chamber 200, air in the air collection chamber 215 must remain in the air collection chamber 215 to provide the necessary counter-pressure to prohibit further aspiration of air from the expansion chamber 205. The plastic deflector baffle 219 of the present invention ensures that air will not depart from the air collection chamber 215 and enter the main heating chamber 200.

Maintaining the proper distance 335 between the exit end 340 of the venturi valve 210 and the plastic deflector baffle 219 will ensure elimination of air bubbles in the water leaving the tank for consumer usage. If the distance 335 from the exit end 340 of the venturi valve 210 to the plastic deflector baffle 219 is too small, water exiting the venturi valve 210 will bounce back at itself and change the aspiration pressure in the venturi valve 210. If the distance 335 is too large, the water exiting the venturi valve 210 will travel around the plastic deflector baffle 219 and render the baffle ineffective. The distance 335 from the exit end 340 of the venturi valve 210 to the plastic deflector baffle 219 is preferably from about 0.1 inches to about 0.8 inches, more preferably from about 0.2 inches to about 0.4 inches, and most preferably about 0.25 inches. In one embodiment of the present invention, the plastic deflector baffle 219 is mounted in the air collection chamber 215 with bypass openings around the plastic deflector baffle 219 so the jet stream water can flow into the main heating chamber 200. By way of example and not limitation, the pressure may be 3 psi in the air collection chamber 215 and 3.1 psi at the top 217 of the air collection chamber 215.

Water enters from the incoming water supply line 245 and continues through a supply line infeed valve 260, through the tank inlet 240, and into the main heating chamber 200. Hot water is delivered to the spout outlet 275 of the faucet 270 from the is upper region of the main heating chamber 200 by way of the tank outlet 230 and, subsequently, the hot water line 235 which leads from the tank outlet 230 to the hot water spout outlet 275. The expansion chamber 205 is vented to the atmosphere by way of a tube 250 whose lower end is exposed to the interior of the expansion chamber 205 and whose upper end is opened to the atmosphere through the interior vent 255 of the faucet 270. In addition to preventing pressure above atmospheric pressure from developing in the expansion chamber 205, venting prevents a buildup of pressure in the main heating chamber 200, as discussed below. The tank has a conventional draining device 225.

If a user draws no hot water from the tank for an extended period of time, the water in the main heating chamber 200 and the expansion chamber 205 will be substantially evenly heated. When hot water is drawn from the tank, it must necessarily be replenished with cold supply water. This allows a new heating cycle inflow of cold supply water to the tank from the incoming water supply line to effectuate an emptying of the expansion chamber 205 of water to provide a volume for incoming cold supply water to expand into as it is heated. Admitting replenishment supply water concurrently with emptying of the expansion chamber 205 is accomplished with a venturi valve 210. This venturi valve is shown in FIG. 2 and enlarged in FIG. 3.

As shown in FIG. 3, the venturi valve 210 is mounted in the expansion chamber 205. Cold supply water flows through the incoming water supply line 245 and through a bore 305 of the venturi valve. This cold supply water imposes pressure on the inlet 310 of a venturi orifice 315. Restricting the flow of the water by way of the small diameter orifice 315 results in a velocity increase in the orifice and, as a result, a jet of water emerges from the exit end 325 of the orifice. Consonant with Bernoulli's principle, the increase in velocity in the orifice is accompanied by a decrease in water pressure relative to the pressure of the hot water in the expansion chamber 205. Hot water initially arrives at the expansion chamber 205 by expanding from the main heating chamber 200. Consequently, hot water from the expansion chamber 205 is drawn into the jet stream through the lateral hole 320 of the venturi valve 210, as described above. The stream of mixed hot and cold water, when is discharged from the exit end 325 of the orifice, is at a pressure well below supply line pressure, but is still sufficiently high to force hot water out of the main heating chamber 200, through the tank outlet 230, and into the hot water line 235 for subsequent user consumption.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A heating tank assembly for a hot water dispenser, comprising:
    a plastic tank body having a main heating chamber for storing and heating water, an expansion chamber, and an air collection chamber, wherein said main heating chamber is in fluid communication with the expansion chamber and the air collection chamber;
    an electric heating element wherein at least a portion of said heating element is located within said main heating chamber of said tank body;
    a magnetic switch electrically connected to said heating element, said magnetic switch located outside said main heating chamber of said tank body; and
    a movable float located within said tank body, said movable float having a magnet to close said magnetic switch when sufficient water is in said tank.

2. The tank assembly of claim 1, wherein said tank body is made of molded plastic.

3. The tank assembly of claim 1, wherein said magnetic switch is a Reed switch.

4. The tank assembly of claim 3, wherein said magnetic switch is normally open when said magnet of said movable float is not in close proximity to said magnetic switch.

5. The tank assembly of claim 1, wherein said movable float has an air pocket.

6. The tank assembly of claim 1, wherein said movable float is made of plastic having a foaming agent.

7. The tank assembly of claim 1, wherein said movable float is triangular.

8. The tank assembly of claim 1, wherein said movable float is rectangular.

9. The tank assembly of claim 1, wherein said heating element has a first portion outside the tank body and a second portion inside the tank body, said heating tank assembly having at least one thermal cutout device located in close proximity to the first portion of the heating element and capable of shutting off the heating element when the heating element reaches a preset temperature.

10. A hot water dispenser, comprising:
    a plastic tank body having a main heating chamber for storing and heating chamber for storing and heating water, an expansion chamber, and an air collection chamber, wherein said main heating chamber is in fluid communication with the expansion chamber and the air collection chamber;
    an electric heating element to heat water in said main heating chamber of said tank body, said heating element extending at least partially into said heating chamber through a bushing mounted to a hole in said tank body; and
    a switch electrically connected to said heating element, said switch capable of determining whether little or no water is present in said tank body, said switch inhibiting the activation of said heating element if the tank body has little or no water.

11. The hot water dispenser of claim 10, wherein said switch is a magnetic switch.

12. The hot water dispenser of claim 11, wherein said magnetic switch is a Reed switch.

13. The hot water dispenser of claim 11, wherein said magnetic switch is normally open.

14. The hot water dispenser of claim 13, wherein said hot water dispenser further comprises a movable float located within said tank body, said movable float having a magnet to close said magnet switch when sufficient water is present in said tank.

15. The hot water dispenser of claim 14, wherein said movable float is triangular.

16. The hot water dispenser of claim 14, wherein said movable float is rectangular.

17. The hot water dispenser of claim 10, wherein said heating element has a first portion outside the tank body, said hot water dispenser having at least one thermal cutout device located in close proximity to the first portion of the heating element and capable of shutting off the heating element when the heating element reaches a preset temperature.

18. The hot water dispenser of claim 10 further including a movable float located within said tank body, said switch is a magnetic switch located outside said tank body and said float includes a magnet that activates said magnetic switch when sufficient water is in said tank.

19. A heating tank assembly for a hot water dispenser, comprising:
    a tank body having a plurality of walls and a main heating chamber for storing and heating water;
    an electric heating element mounted to said tank body, said heating element having a first portion located outside the tank body and a second portion located inside the tank body; and
    at least one thermal cutout device located in close proximity to the first portion of the heating element and capable of shutting off the heating element when the heating element reaches a preset temperature, said thermal cutout device wrapped in insulating tape.

20. The tank assembly of claim 19, further comprising a magnetic switch and a movable float, said magnetic switch electrically connected to said heating element, said movable float located within said tank body, said movable float having a magnet to close said magnetic switch when sufficient water is in said tank.

21. The tank assembly of claim 20 wherein said magnetic switch is located outside said tank body.

22. A heating tank assembly for a hot water dispenser, comprising:
- a plastic tank body having a main heating chamber for storing and heating water, an expansion chamber, and an air collection chamber, wherein said main heating chamber is in fluid communication with the expansion chamber and the air collection chamber;
- an electric heating element wherein at least a portion of said heating element is located within said main heating chamber of said tank body; and
- a switch electrically, connected to said heating element, said switch capable of preventing said heating element from energizing when insufficient water is in said tank, said switch is mounted to said tank body without placing a hole through said tank walls.

23. The heating tank assembly of claim 22 wherein said switch is a magnetic switch.

24. The heating tank assembly of claim 22 wherein said switch comprises a magnetic switch located outside of said tank body and a movable float located inside said tank body, said movable float having a magnet to activate said magnetic switch when sufficient water is in said tank.

25. The heating tank assembly of claim 22 wherein said switch is a thermal cutout device.

26. The heating tank assembly of claim 24 wherein said heating element has a first portion outside said tank body and a second portion inside said tank body, said thermal cutout device located in close proximity to said first portion of said heating element, said thermal cutout device capable of shutting off said heating element when said heating element reaches a preset temperature.

\* \* \* \* \*